(12) United States Patent
Athelogou et al.

(10) Patent No.: US 9,466,103 B2
(45) Date of Patent: *Oct. 11, 2016

(54) BIOMARKER EVALUATION THROUGH IMAGE ANALYSIS (71) Applicant: Definiens AG, Munich (DE)

(72) Inventors: Maria Athelogou, Munich (DE); Gerd Binnig, Kottgeisering (DE); Guenter Schmidt, Munich (DE)

(73) Assignee: Definiens AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,378

(22) Filed: Apr. 27, 2015

(65) Prior Publication Data

US 2015/0228075 A1  Aug. 13, 2015

Related U.S. Application Data (63) Continuation of application No. 13/282,450, filed on Oct. 26, 2011, now Pat. No. 9,042,630.

(51) Int. Cl.
*G06K 9/00* (2006.01)
*G06T 7/00* (2006.01)
*G06K 9/46* (2006.01)

(Continued)

(52) U.S. Cl.
CPC ........... *G06T 7/0012* (2013.01); *G06K 9/0014* (2013.01); *G06K 9/34* (2013.01); *G06K 9/4652* (2013.01); *G06K 9/6215* (2013.01); *G06T 7/0079* (2013.01); *G06T 7/0081* (2013.01); *G06T 7/0091* (2013.01); *G06T 7/408* (2013.01); *G06T 2207/10024* (2013.01);

(Continued)

(58) Field of Classification Search
None
See application file for complete search history.

(56) References Cited

U.S. PATENT DOCUMENTS 7,563,569 B2   7/2009   Seul et al. ............... 435/6.18
8,060,348 B2 * 11/2011  Cline .................. G06K 9/0061
                                                    382/128

(Continued)

FOREIGN PATENT DOCUMENTS

WO    WO2011/059686    10/2009

OTHER PUBLICATIONS

"High-performance Image Analysis for Microscopy—The Visiopharm Integrator System Visiomorph," brochure by Visiopharm A/S, Hørsholm, Denmark, www.visiopharm.com (6 pages).

(Continued)

*Primary Examiner* — Nancy Bitar
(74) *Attorney, Agent, or Firm* — Imperium Patent Works; Darien K. Wallace (57) ABSTRACT A method for determining whether a test biomarker is a stain for a type of cell component, such as membrane or nucleus, involves performing various segmentation processes on an image of tissue stained with the test biomarker. One segmentation process searches for a first cell component type, and another segmentation process searches for a second cell component type by segmenting only stained pixels. The test biomarker is identified as a stain for each component type if the process identifies the component based only on stained pixels. Whether the test biomarker is a membrane stain or nucleus stain is displayed on a graphical user interface. In addition, the method identifies stained pixels corresponding to a second cell component using pixels determined to correspond to a first cell component. An expression profile for the test biomarker is then displayed that indicates the proportion of stained pixels in each type of cell component.

19 Claims, 12 Drawing Sheets (51) Int. Cl.
*G06K 9/62* (2006.01)
*G06T 7/40* (2006.01)
*G06K 9/34* (2006.01)

(52) U.S. Cl.
CPC ............... *G06T 2207/10056* (2013.01); *G06T 2207/20141* (2013.01); *G06T 2207/30024* (2013.01)

(56) References Cited

U.S. PATENT DOCUMENTS

| | | | |
|---|---|---|---|
| 8,594,410 B2 | 11/2013 | Schmidt et al. | 382/132 |
| 8,699,769 B2 | 4/2014 | Schoenmeyer et al. | 382/128 |
| 8,711,149 B2* | 4/2014 | Schmidt | G06F 19/321 |
| | | | 345/440 |
| 8,879,813 B1 | 11/2014 | Solanki et al. | 382/128 |
| 9,159,129 B2* | 10/2015 | Schoenmeyer | G06T 7/0012 |
| 2004/0122708 A1 | 6/2004 | Avinash et al. | 705/2 |
| 2005/0136549 A1 | 6/2005 | Gholap et al. | 436/501 |
| 2009/0116724 A1 | 5/2009 | Yamashita et al. | 382/133 |
| 2009/0263820 A1 | 10/2009 | Seul et al. | 435/6.14 |
| 2010/0220916 A1 | 9/2010 | Salafia et al. | 382/134 |
| 2010/0279341 A1 | 11/2010 | Steiner et al. | 435/40.5 |
| 2011/0026803 A1* | 2/2011 | Can | G06T 5/004 |
| | | | 382/133 |
| 2011/0091091 A1 | 4/2011 | Sarachan et al. | 382/133 |
| 2011/0111435 A1 | 5/2011 | Dobson et al. | 435/7.23 |
| 2011/0122138 A1 | 5/2011 | Schmidt et al. | 345/440 |
| 2012/0219206 A1* | 8/2012 | Janowczyk | G06K 9/6224 |
| | | | 382/133 |
| 2012/0264142 A1 | 10/2012 | Bloom et al. | 435/7.24 |

OTHER PUBLICATIONS

Al-Kofahi et al., "Cell-based quantification of molecular biomarkers in histopathology specimens," Histopathology, vol. 59, No. 1, published pp. 40-54; Jul. 19, 2011, (XP055091129) (22 pages).
European Search Report dated Dec. 12, 2013 in counterpart foreign application EP12189735.9 (13 pages).

* cited by examiner

BIOMARKER EVALUATION THROUGH IMAGE ANALYSIS

CROSS REFERENCE TO RELATED APPLICATION

This application is a continuation of, and claims priority under 35 U.S.C. §120 from, nonprovisional U.S. patent application Ser. No. 13/282,450 entitled "Biomarker Evaluation Through Image Analysis," now U.S. Pat. No. 9,042,630, filed on Oct. 26, 2011, the subject matter of which is incorporated herein by reference.

TECHNICAL FIELD

The present invention relates generally to image analysis, and more specifically to a system for evaluating molecular biomarkers based on the results of image analysis.

BACKGROUND

Systems for detecting and analyzing target patterns in digital imagery have a wide variety of uses. One application of quantitative image analysis is the measurement of the staining intensity of cell components by specific receptors, also called biomarkers. For example, an image analysis system has been developed that segments cell membranes in digital images of cancer tissue that has been stained with a specific biomarker, such as the HER2 protein. The system then uses spatial recognition algorithms to quantify the membrane staining intensity, which provides an indication of the extent of cancer in the tissue being analyzed. Thus, the system is able to replace the conventional subjective grading procedures of a physician who visually grades a stained tissue sample with an automated quantification of membrane staining intensity.

Current automated staining intensity measurements, however, are performed only on tissue that has been stained with known biomarkers, to which the spatial recognition algorithms are tailored. But there are relatively few biomarkers whose staining behavior is known compared to the number of proteins and receptors that could potentially be used in the immunohistochemical study of tissue, such as cancer tissue.

A method is sought for evaluating the staining characteristics of proteins and receptors whose behavior in various types of tissue is not yet known in order to use those proteins and receptors as biomarkers.

SUMMARY

A system determines whether a test biomarker is a stain for various cell component types by performing multiple segmentation processes on a digital image of tissue that has been stained with the test biomarker. Cell component types include the cell membrane, nucleus, cytoplasm and organelles, such as mitochondria, vacuoles, lysosomes and centrosomes. One segmentation process searches for a first cell component type by segmenting pixels with the predetermined color of the test biomarker.

The predetermined color can be a range of colors such that the segmentation process searches for cell components of the first cell component type that have colors within the range of colors. Another segmentation process searches for a second cell component type also based on pixels stained by the test biomarker. The test biomarker is identified as a stain for the first or the second cell component type if the respective segmentation process identifies that cell component type based only on pixels stained by the test biomarker. The system displays on a graphical user interface an indication of whether the test biomarker is a stain for each type of cell component.

In one aspect, the first segmentation process searches for membranes. The first segmentation process identifies a starting pixel in the digital image of the sample tissue. Then the process expands from the starting pixel into each successive neighboring pixel so long as the neighboring pixel has a color that is not more dissimilar to the predetermined color of the test biomarker than is the previous neighboring pixel. The expanding into successive neighboring pixels is halted at a boundary at which the neighboring pixel of each boundary pixel has a color that is more dissimilar to the predetermined color than is the boundary pixel. The system then counts the total number of membranes in the digital image. The system also determines whether the membranes are clumped together or are dispersed throughout the stained tissue.

In another embodiment, sample tissue is stained with both a test biomarker and a known stain. Then a digital image is acquired of the stained tissue. A first cell component region that is stained by the known stain and that corresponds to a first cell component is first identified. A second cell component region that corresponds to a second cell component is then identified using the first cell component region.

The proportion of pixels within the second cell component region whose colors fall within a selected color range is determined. The color range is selected such that the test biomarker stains tissue to have a color that falls within the selected color range. The test biomarker can be a combination of unknown stains. The test biomarker is identified as a stain for the second cell component if the proportion of pixels whose colors fall within the selected color range exceeds a predetermined proportion. The system displays on a graphical user interface an indication of whether the test biomarker is a stain for the second cell component.

In yet another embodiment, the system identifies a first group of pixels that corresponds to a first cell component and a second group of pixels that corresponds to a second cell component. The second group of pixels is identified using the first group of pixels. From the first group of pixels, a first stained proportion of pixels is determined whose colors fall within a selected color range. Again, the test biomarker stains tissue to have a color that falls within the selected color range. A second stained proportion of pixels of the second group of pixels is determined whose colors fall within the selected color range. The system displays on the graphical user interface an expression profile of the test biomarker. The expression profile includes the first stained proportion corresponding to the first cell component and the second stained proportion corresponding to the second cell component. The expression profile is like a fingerprint of how each test biomarker stains each type of tissue.

A method for generating an expression parameter for a test biomarker includes performing first and second segmentation processes, counting cell components stained by the test biomarker, calculating the expression parameter using the total numbers of first and second cell components stained by the test biomarker, and displaying the expression parameter on a graphical user interface. A digital image depicts tissue that is stained with the biomarker to have a predetermined color. A first segmentation process is performed on the digital image that searches for a first cell component type having the predetermined color. The first segmentation process identifies a plurality of cell components of the first cell component type.

A second segmentation process is performed on the digital image that searches for a second cell component type that has the predetermined color. The second segmentation process identifies a second plurality of cell components of a second cell component type. A first total number of the plurality of cell components of the first cell component type is counted in an area of the digital image, and a second total number of the second plurality of cell components of the second cell component type is counted in the area of the digital image. The first total number and the second total number of cell components is stored in a database. The expression parameter for the test biomarker is calculated using the first total number and the second total number, and the expression parameter is displayed on the graphical user interface.

In another aspect, the cell components are also stained by a known stain to have a second color. The second segmentation process is performed on the digital image that searches for the second cell component type that has the second color instead of the predetermined color. The second segmentation process identifies the second plurality of cell components of the second cell component type. The expression parameter for the test biomarker is calculated using the first total number of cell components stained by the test biomarker and the second total number of cell components stained by the known stain.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
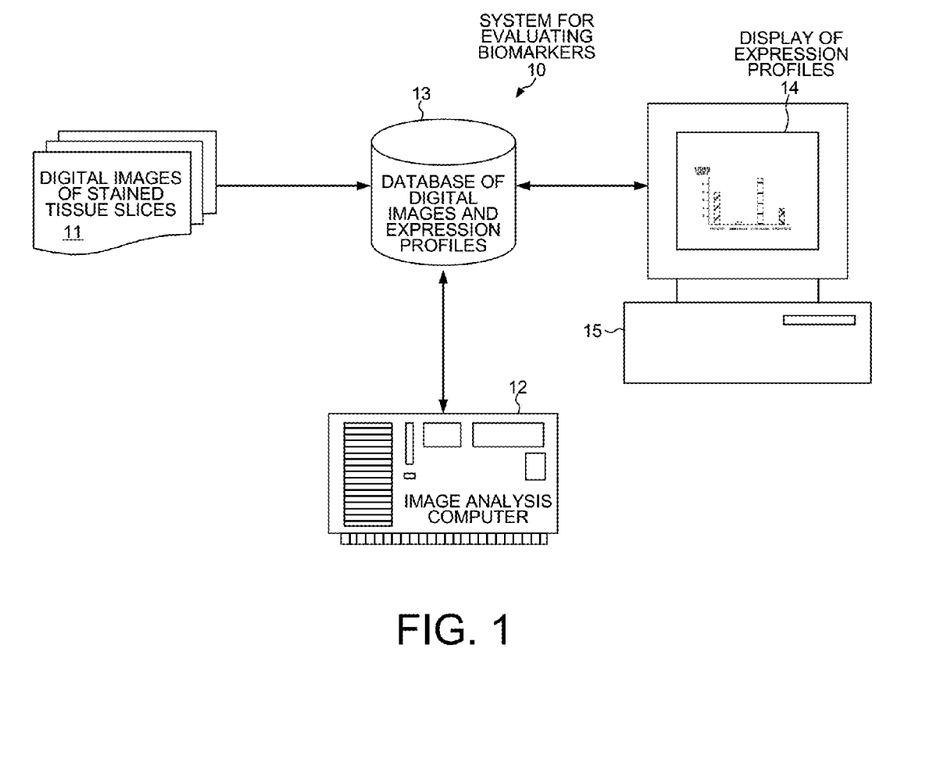
FIG. 1 is a diagram of a novel system that evaluates test biomarkers to determine their expression profiles.

FIG. 1 shows a system 10 for evaluating test molecular biomarkers to determine their expression profiles. For example, system 10 determines whether a test biomarker is a stain for a specific type of cell component, such as the nucleus, the cell membrane, the cytoplasm or a specific organelle, such as the mitochondria. The input to system 10 are digital images of tissue slices that are stained by the test biomarkers, which can be proteins and receptors. The tissue slices can also be stained with known stains. Digital images 11 are acquired of the stained tissue samples. System 10 then performs image analysis on the digital images. An image analysis computer 12 performs intelligent image processing and automated classification, segmentation and quantification. The image processing is performed by computer-executable instructions stored on a computer-readable medium, such as a hard disk, a flash memory card or a CD. The digital images, as well as the characterization of each test biomarker, are stored in a database 13. For example, each test molecular biomarker is characterized as being a stain for the nucleus, the membrane, the cytoplasm or a specific organelle. And the relative staining of these cell components is represented as an expression profile of the test biomarker. Finally, the characterization and expression profile of each test biomarker is displayed to the user of system 10 on a graphical user interface 14, such as the screen of a personal computer 15.

Figure 2:
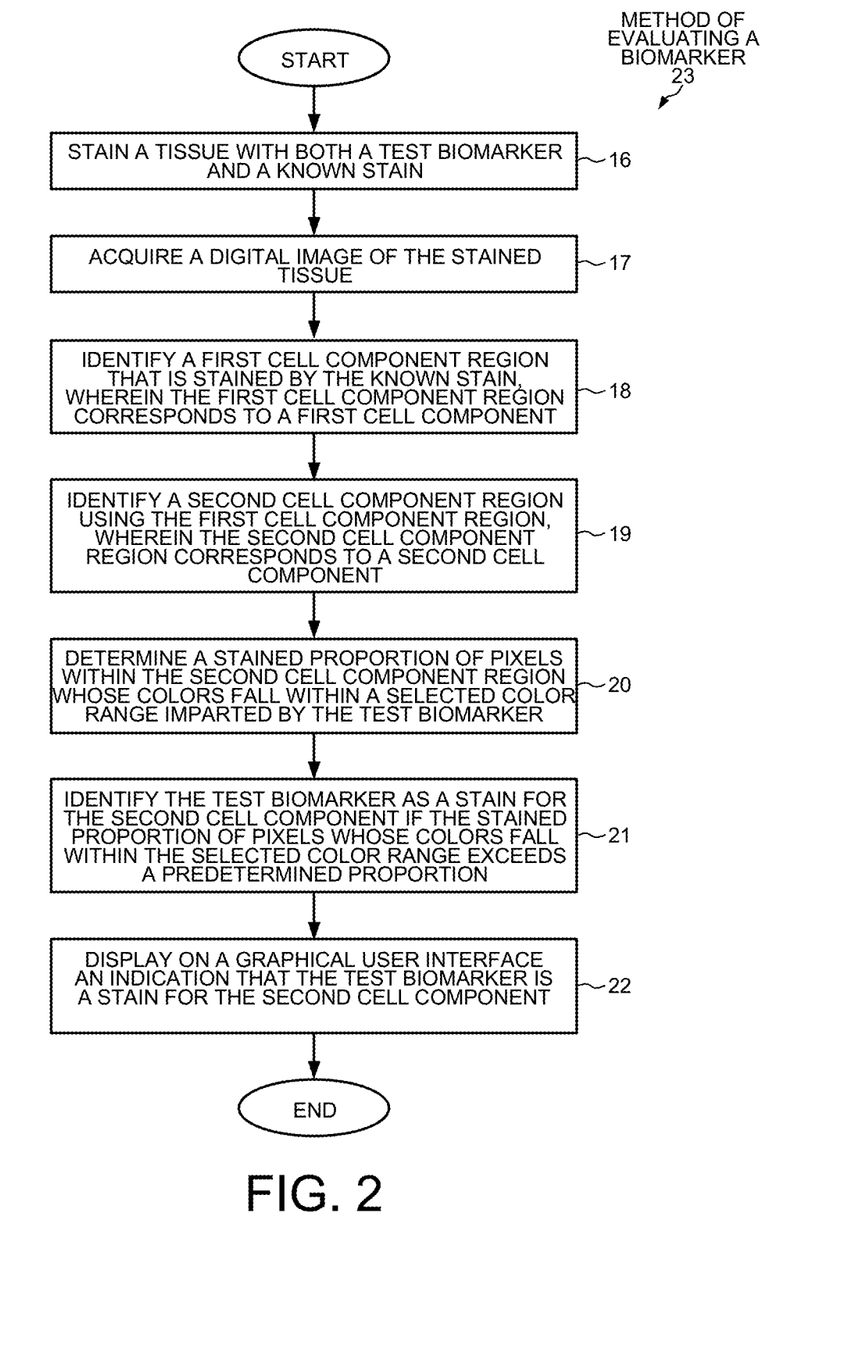
FIG. 2 is a flowchart of the steps performed by the system of FIG. 1 for evaluating test biomarkers.

FIG. 2 is a flowchart of steps 16-22 of a method 23 by which system 10 evaluates test biomarkers. In a first step 16, a sample tissue is stained with both a test biomarker and a known stain. For example, the tissue could be human breast or lung tissue known to include a particular type of cancerous cells. The known stain could, for example, be one of hematoxylin and eosin (H&E), Human Epidermal growth factor Receptor 2 (HER2), Her2/neu cytoplasmic stain, tumor marker Ki67, estrogen receptor (ER) stain, progesterone receptor (PR) stain, cluster of differentiation 44 (CD44) antibody stain or CD23 antibody stain. The test molecular biomarker is any protein, receptor, antibody or any other stain for which the behavior of the staining is not yet known. The test biomarker could also be a combination of receptors and proteins, i.e., multiple unknown stains.

Figure 3:
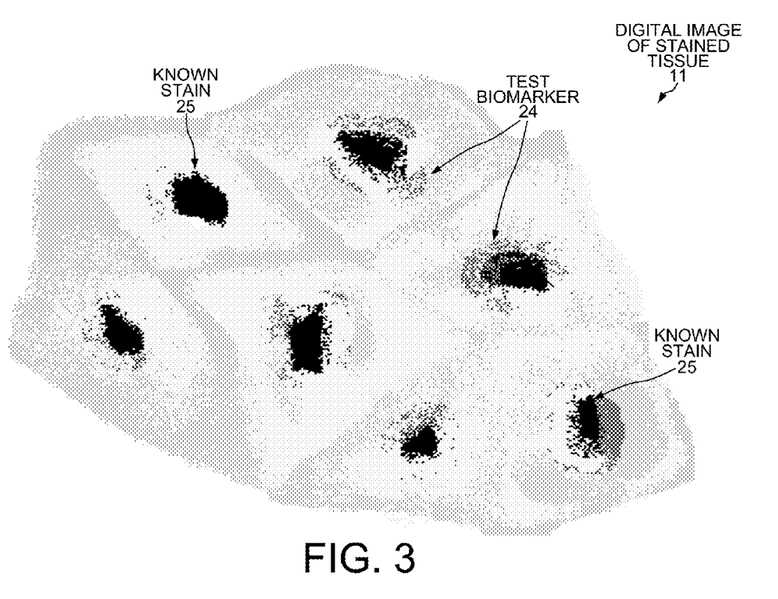
FIG. 3 is a digital image of tissue that is stained with both a test biomarker and a known stain.

In step 17, a digital image 11 of the stained tissue is acquired using a camera. FIG. 3 shows a digital image of tissue that is stained with both a test biomarker 24 and a known stain 25. In FIG. 3, pixels corresponding to areas of the tissue stained with test biomarker 24 appear as dark gray, whereas pixels corresponding to areas stained with known stain 25 appear as black.

Figure 4:
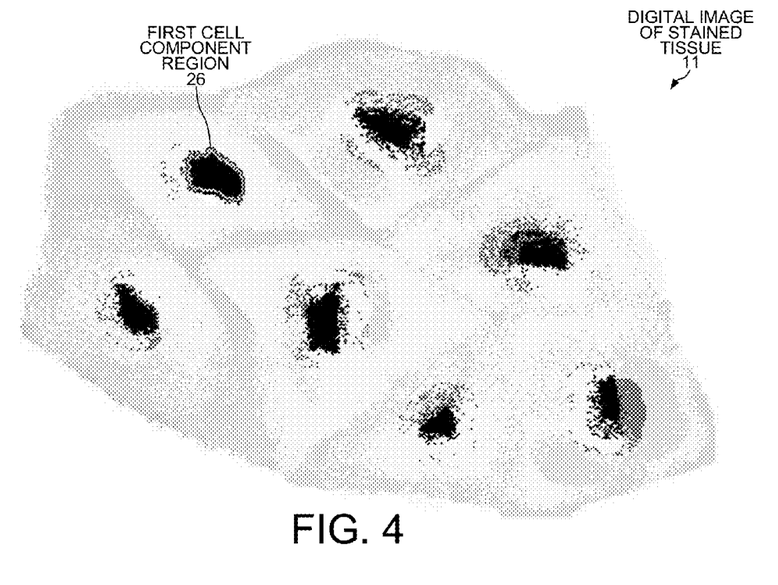
FIG. 4 shows the image of FIG. 3 in which a cell component region has been outlined.

In step 18, a first cell component region 26 that is stained by known stain 25 is identified. FIG. 4 shows that first cell component region 26 has been identified and outlined by system 10. Each of the regions in the tissue that have been stained by known stain 25 correspond to a first cell component. In the example of FIG. 4, hematoxylin and eosin (H&E) stain is used to stain the nuclei of the tissue, so first cell component region 26 is identified as the nucleus.

In step 19, a second cell component region is identified using first cell component region 26. To identify the second cell component region, system 10 applies an approximate segmentation process that efficiently estimates other cell component regions using the first cell component region.

Figure 5:
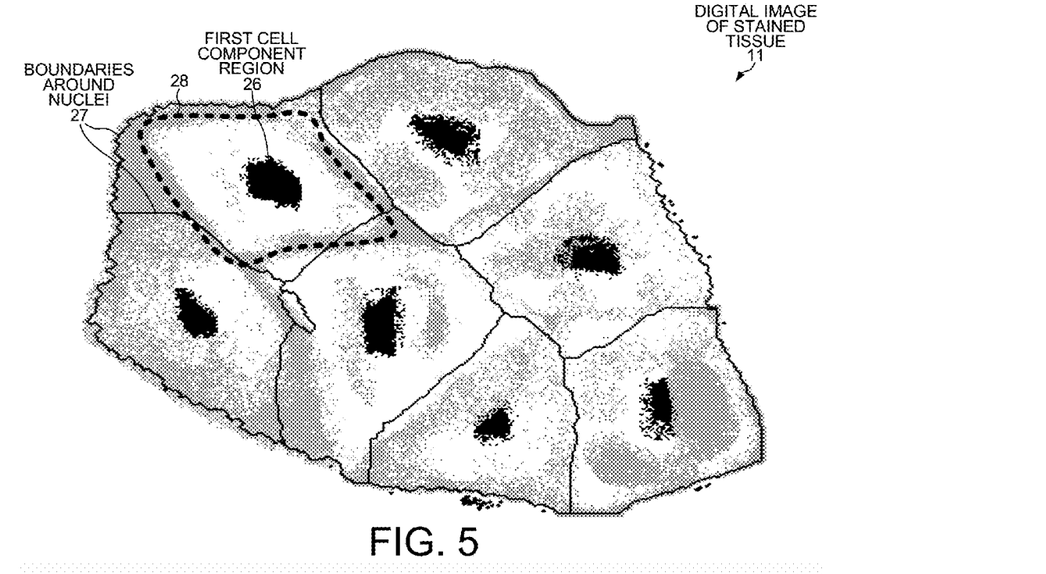
FIG. 5 is a digital image of tissue in which boundaries have been generated that approximate the cell walls.

FIG. 5 shows boundaries 27 around the nuclei in image 11 that approximate the cell walls. The boundaries 27 are obtained by growing an area out from each nucleus on a pixel-by-pixel basis until the growth from an adjacent nucleus is reached or until an edge of the tissue is reached. The dashed boundary 28 shows an approximate location of a cell membrane based on the different intensities of pixels in the cytoplasm and cell membrane. It is evident from FIG. 5 that the boundaries 27 do not coincide exactly with the location of the cell membrane based on pixel intensity. Determining the boundaries 27 using the stained nuclei, however, is less computationally intensive and thus quicker than comparing the intensities of individual pixels. Moreover, the location of the boundaries between all cells cannot be accurately determined using pixel intensity alone, as is apparent from the cells towards the right side of digital image 11.

Figure 6:
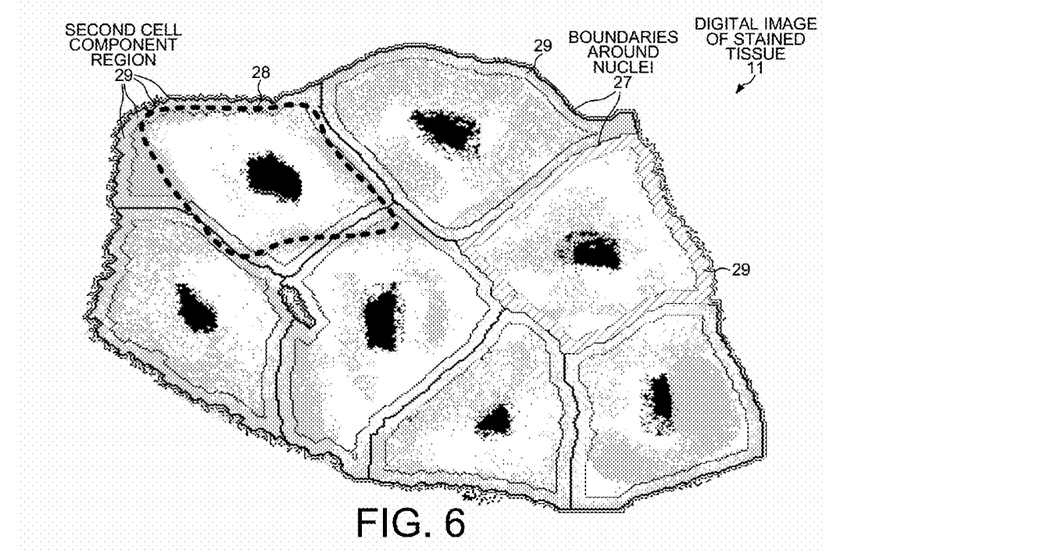
FIG. 6 shows the image of FIG. 5 in which a region has been formed by expanding inwards from the boundaries.

Next, in order to identify the second cell component region using first cell component region 26, the thickness of the boundaries 27 between the cells is expanded. FIG. 6 shows that a region 29 is defined by expanding inwards towards each nucleus from the boundaries 27. Region 29 is a second cell component region that corresponds to the cell membrane. As explained above, second cell component region 29 does not exactly coincide with the cell membrane, but approximately overlaps the cell membranes on average for all cells in digital image 11. Second cell component region 29 of the cell towards the upper right in FIG. 6 is designated by diagonal hatching.

Figure 7:
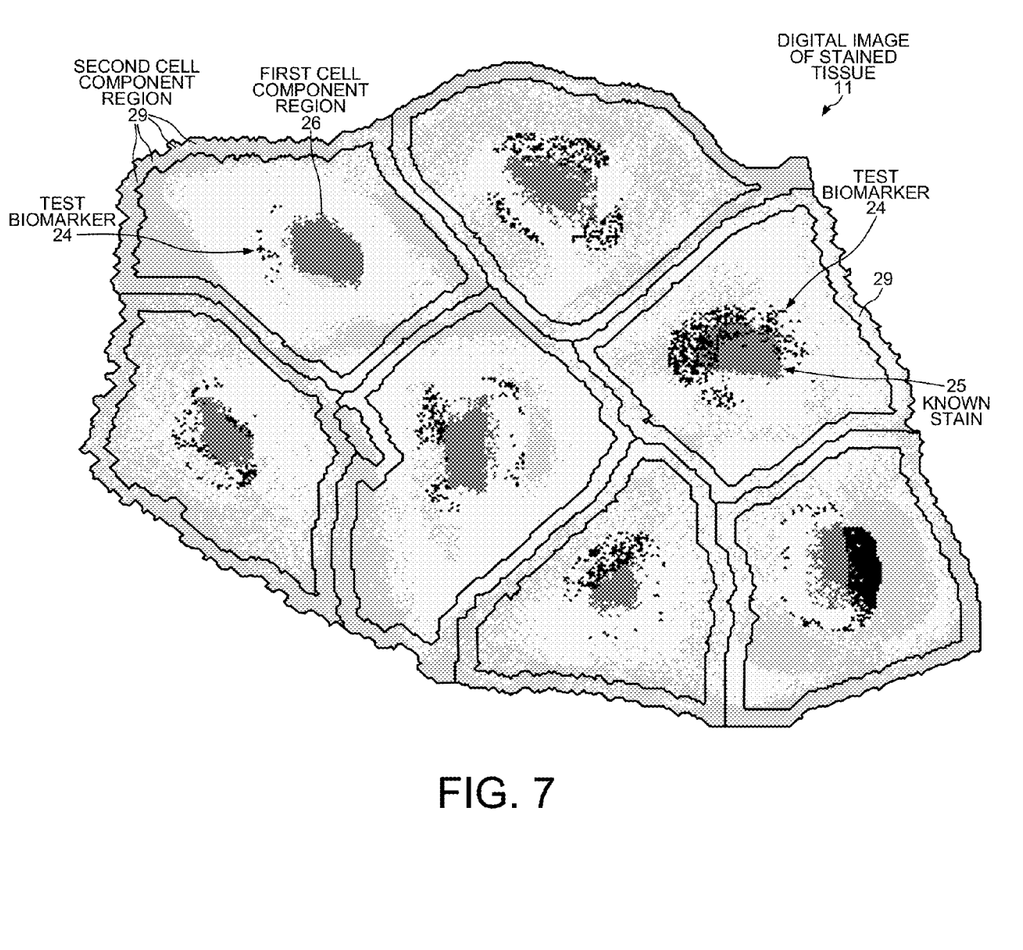
FIG. 7 illustrates the determination of the stained proportion of pixels in the cell regions of FIG. 6.

In step 20, the stained proportion of pixels within second cell component region 29 that have the color of the test biomarker 24 is determined. An exemplary determination of the stained proportion of pixels is now performed for the cell towards the upper right of FIG. 7. In FIG. 7, pixels that have the color of the test biomarker 24 appear as black, whereas pixels that have the color of the known stain 25 appear as dark gray. The digital images that are used to evaluate test biomarkers, however, are color images. The colors are typically represented in a color space. For example, in the RGB color space, three 3-digit numbers in the range from zero to 255 define the color. The three numbers represent the amounts of red, green and blue in the represented color. For example, red is represented as 255-0-0, dark green is represented as 0-100-0, royal blue is designated as 65-105-225, white is represented as 255-255-255, and black is represented as 0-0-0. Smaller numbers represent darker colors, so 100-100-100 is a darker gray than 200-200-200, and 0-0-128 is a darker blue (navy) than straight blue 0-0-255. Although this embodiment is described in relation to the RGB color space, other color spaces and representations may also be used, such as the CMYK (cyan, magenta, yellow, black) color model, the CIE 1931 color space, the 1964 xyz color space or the HSV and HSL representation of the RGB color space.

To determine whether a pixel in second cell component region 29 has the color of the test biomarker 24, system 10 determines whether the color of that pixel falls within a selected color range around the color of the test biomarker. If the color of the test biomarker is Indian red (205-92-92), for example, then a color range can be selected that includes all colors represented by the RGB numbers that have the proportions 2.1-2.3:0.9-1.1:0.9-1.1. So colors will fall within the selected color range that are a darker and lighter shades of Indian red, such as 103-46-46 and 246-110-110, as well as colors that are close to Indian red, such as 210-90-90. The percentage by which the color range straddles a center color can be selected by the user of system 10. For example, the selected color range can be firebrick red (178-34-34) plus or minus three percent for each of the three numbers. The range is selected such that the test biomarker 24 stains tissue to have a color that falls within the selected color range.

In some situations, the test biomarker 24 does not stain tissue to have the same color as the test biomarker itself. Moreover, the test biomarker 24 may stain different tissues different colors. In order to determine the color that the test biomarker 24 stains specific tissues, a digital image can be acquired of the tissue sample before the tissue sample is stained with the test biomarker 24. Then the change in color is compared between the image of the unstained sample and the stained image 11. The color in the areas of greatest color change is accepted as the color that the test biomarker stains tissue and is used to determine the selected color range.

The total number of pixels within second cell component region 29 that have a color that falls within the selected color range is then determined. This number of colored pixels is then divided by the total number of pixels in second cell component region 29 in order to determine the stained proportion of pixels within second cell component region 29 whose colors fall within the selected color range. The cell towards the upper right of FIG. 7 hardly has any pixels with colors within the selected color range, so stained proportion of pixels within second cell component region 29 is less than 1%.

In step 21, the test biomarker 24 is identified as a stain for second cell component 29 (the membrane) if the stained proportion of pixels whose colors fall within the selected color range exceeds a predetermined proportion. In one example, the predetermined proportion is 10%, so test biomarker 24 is not identified as a membrane stain because the stained proportion of pixels does not exceed 10%.

Figure 8:
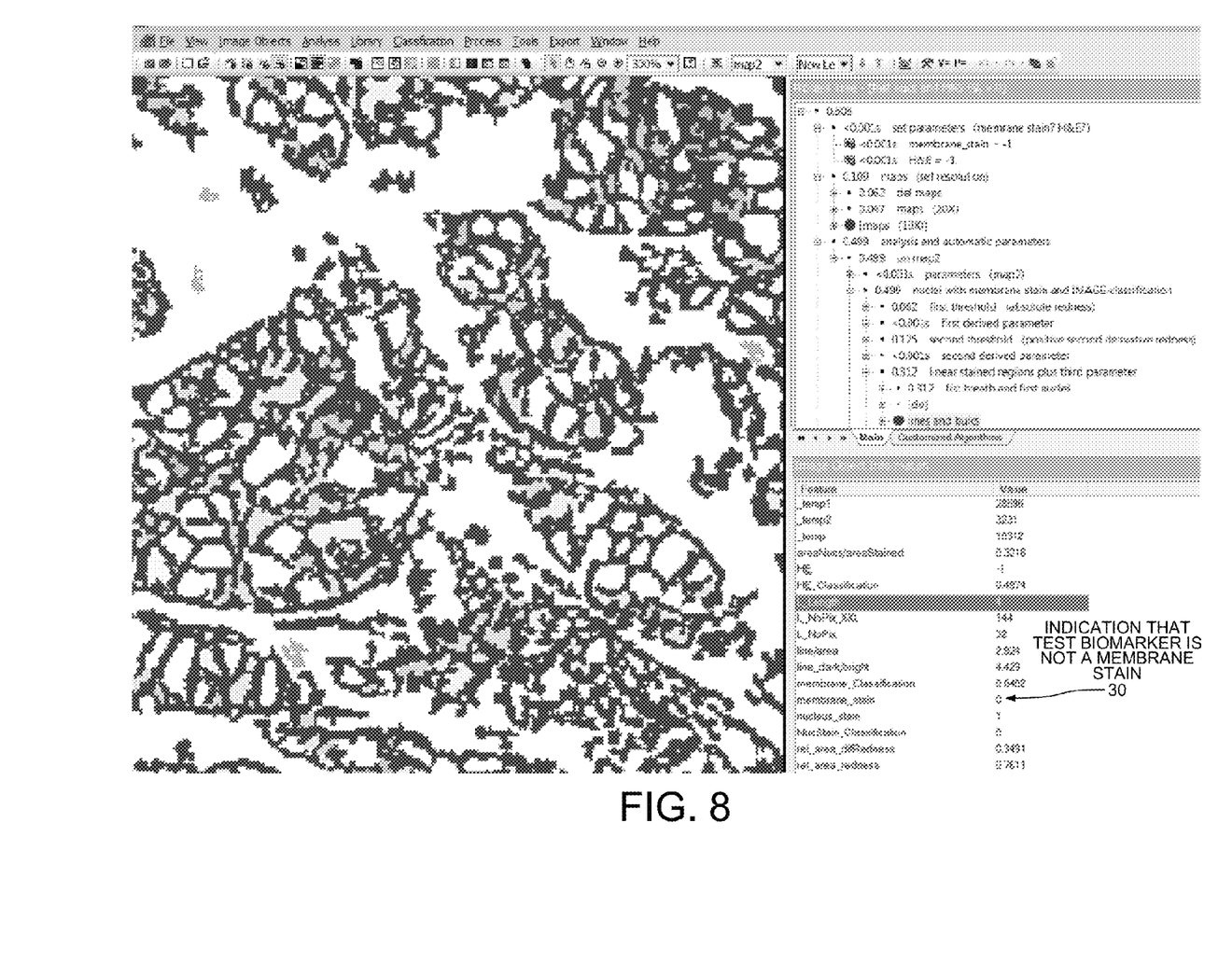
FIG. 8 shows the graphical user interface of the system of FIG. 1 with an indication of whether a test biomarker is a stain for a particular cell component.

In step 22, an indication whether the test biomarker 24 is a stain for second cell component 29 is displayed on graphical user interface 14 of system 10. FIG. 8 shows graphical user interface 14 with one example of an indication 30 of whether test biomarker 24 is a stain for second cell component 29. The "0" after "membrane_stain" indicates that test biomarker 24 is determined not to be a membrane stain.

Figure 9:
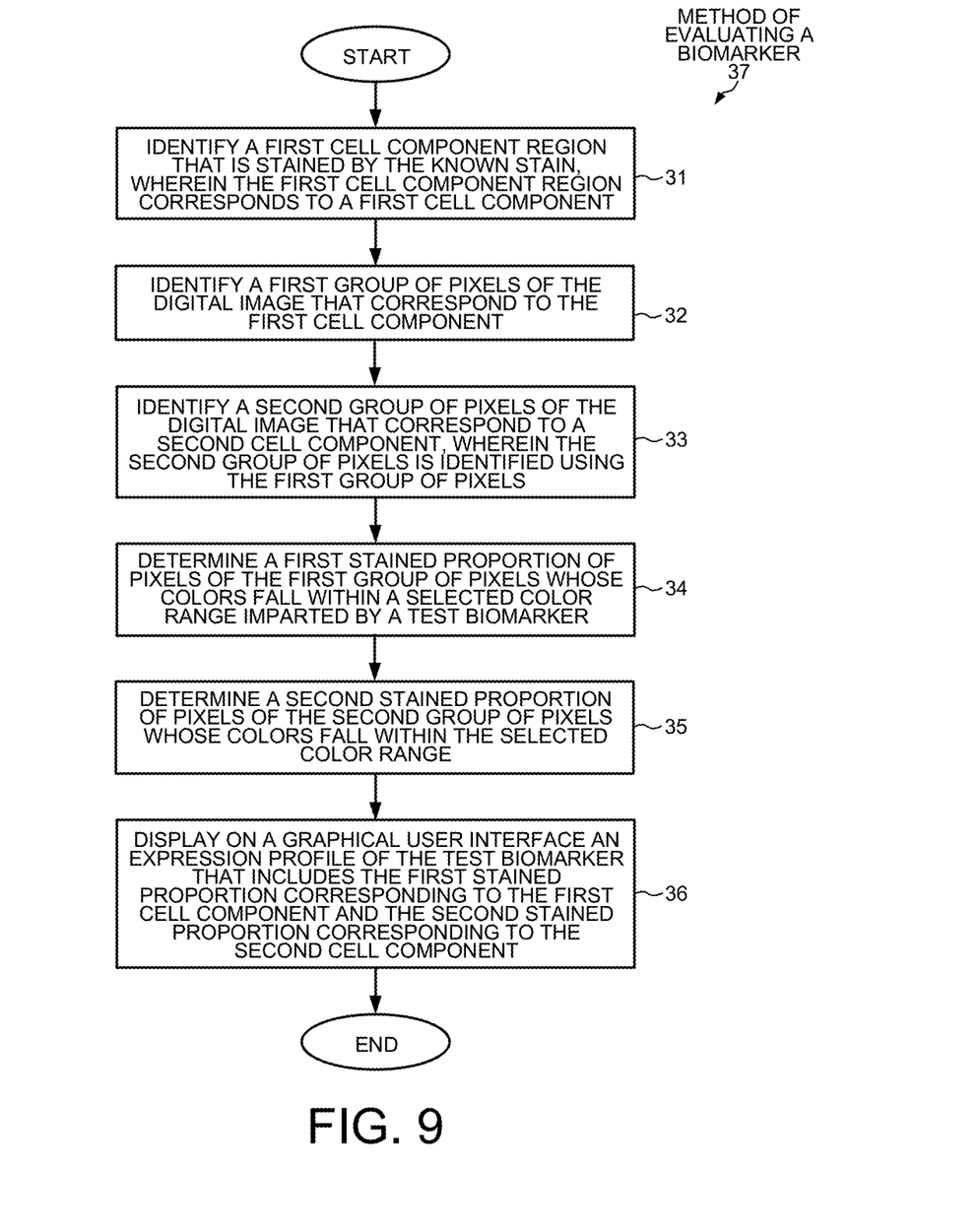
FIG. 9 is a flowchart of steps of another method by which the system of FIG. 1 evaluates test biomarkers.

FIG. 9 is a flowchart of steps 31-36 of another method 37 by which system 10 evaluates test biomarkers. As in method 23, a sample tissue is stained with both a test biomarker and a known stain, and a digital image of the stained tissue is acquired.

In step 31, a first cell component that is stained by known stain 25 is identified. For example, hematoxylin stain is used to stain the nuclei of the tissue, so first cell component is identified as the nucleus.

In step 32, a first group of pixels of the digital image that correspond to the first cell component is identified. For example, the contiguous group of dark gray pixels that make up the nucleus of the upper right cell in FIG. 7 is identified.

In step 33, a second group of pixels of the digital image that correspond to a second cell component is identified. For example, the pixels within membrane region 29 of FIG. 7 are identified using the first group of nucleus pixels in the manner described in step 19 of method 23. In addition, a third group of pixels is identified that correspond to a third cell component. For example, the pixels inside of membrane region 29 that are not nucleus pixels are identified as cytoplasm pixels. Finally, some pixels are removed from the cytoplasm pixels based on their color and intensity and are identified as corresponding to particular organelles, such as mitochondria, vacuoles, lysosomes and centrosomes.

In step 34, a first stained proportion of pixels of the first group of pixels whose colors fall within a selected color range is determined. As in step 20 of method 23, the color range is selected such that the test biomarker stains tissue to have a color that falls within the selected color range. For example, if the test biomarker stains tissue to have the color firebrick red (178-34-34), then the proportion of pixels in the nucleus is determined that have a color that is plus or minus four percent of each of the three numbers defining firebrick red. For the upper right cell in FIG. 7, the first stained proportion is determined to be 8% if eighty of the total one thousand pixels of the nucleus have colors that fall within the selected color range.

In step 35, a second stained proportion of pixels of the second group of pixels whose colors fall within the selected color range is determined. With regard to the upper right cell in FIG. 7, the second stained proportion is the number of pixels corresponding to the membrane that have colors that fall within the selected color range divided by the total number of pixels that correspond to the membrane. For the upper right cell in FIG. 7, the second stained proportion appears to be less than 1% because hardly any pixels that correspond to the membrane appear to have the dark color of the test biomarker.

A third stained proportion is the number of pixels corresponding to the cytoplasm that have colors that fall within the selected color range divided by the total number of pixels that correspond to the cytoplasm (which does not include organelle pixels). For the upper right cell in FIG. 7, the third stained proportion appears to be greater than 10%.

Figure 10:
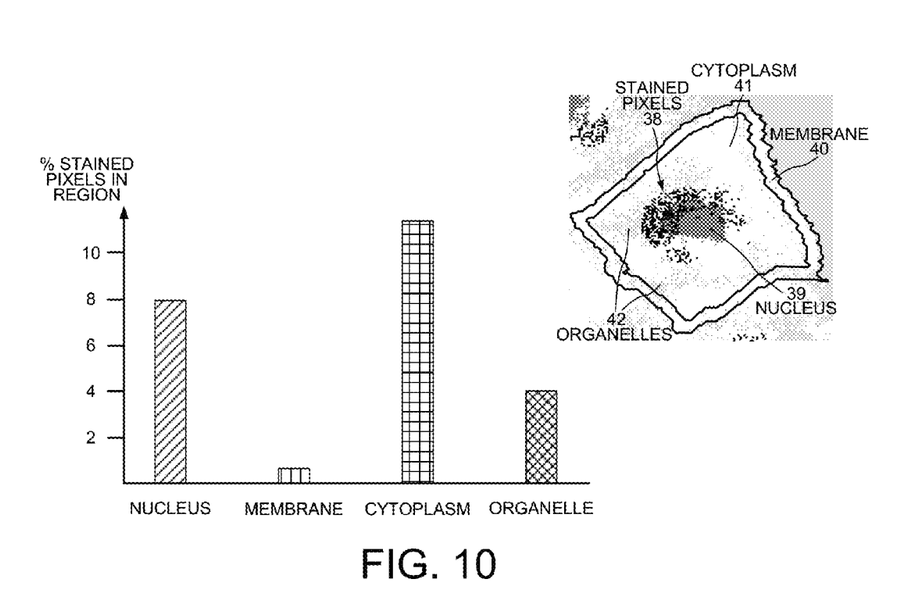
FIG. 10 is a representation of an expression profile for the test biomarker in the stained tissue in the digital image of FIG. 3.

In step 36, an expression profile of the test biomarker is displayed on graphical user interface 14. FIG. 10 is one representation of an expression profile for the test biomarker 24 in the stained tissue of digital image 11. FIG. 10 is a bar graph showing the percentage of pixels in the regions of each cell component that have colors in a range around the staining color of the test biomarker 24. The expression profile indicates the proportion of stained pixels 38 for each cell component. The expression profile includes the first stained proportion corresponding to the first cell component 39 (nucleus), the second stained proportion corresponding to the second cell component 40 (membrane), as well as the proportion of stained pixels for the cytoplasm 41 and the various organelles 42.

The expression profile is like a fingerprint of the test biomarker on a specific tissue. System 10 generates a fingerprint for the test biomarker for each type of tissue that is tested. System 10 fills database 13 with the expression profiles of many test biomarkers on many types of tissues. Database 13 can then be consulted to find a new biomarker that stains a desired cell component in a particular type of tissue. System 10 can be used to identify tumor-specific markers for specific types of cancerous tissues. It should be noted, however, that tumors are normally not homogeneously stained by a biomarker. A test biomarker may stain the same tumor region of the tissue inhomogeneously. In this case, the test biomarker would have multiple expression profiles for one particular type of tumor tissue.

Figure 11:
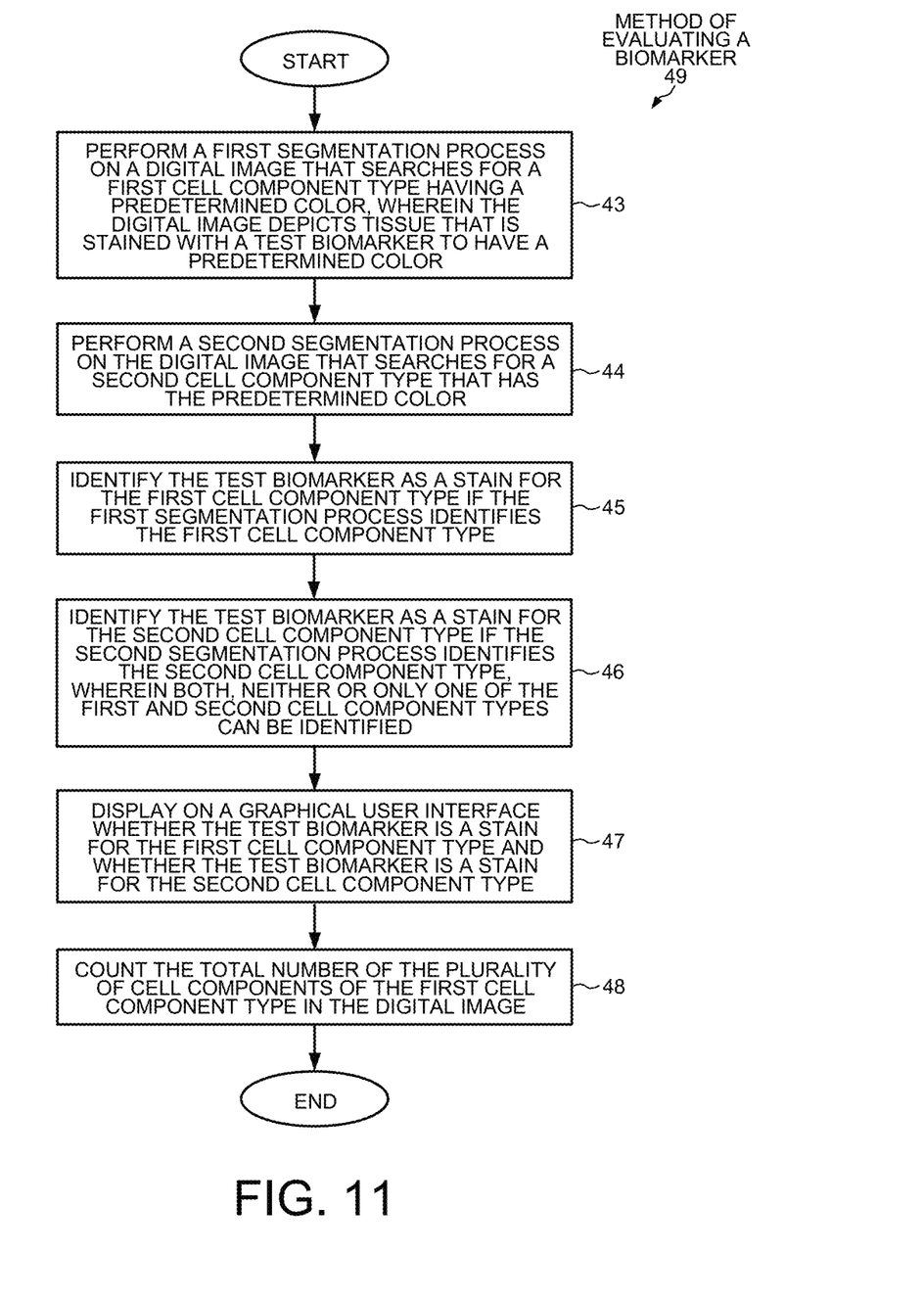
FIG. 11 is a flowchart of the steps of yet another method by which the system of FIG. 1 evaluates test biomarkers.

FIG. 11 is a flowchart of steps 43-48 of yet another method 49 by which system 10 evaluates test biomarkers. Although in method 49 a sample tissue is stained with a test biomarker, as in methods 23 and 37, the sample tissue need not be stained in method 49 with a known stain. The test biomarker stains the sample tissue to have a predetermined color. A digital image of the stained tissue is then acquired.

In step 43, a first segmentation process is performed on the digital image. The first segmentation process searches for a first cell component type having the predetermined color. The predetermined color of the test biomarker is actually a range of colors, so the first segmentation process searches for cell components of the first cell component type that have colors within the range of colors.

Figure 12:
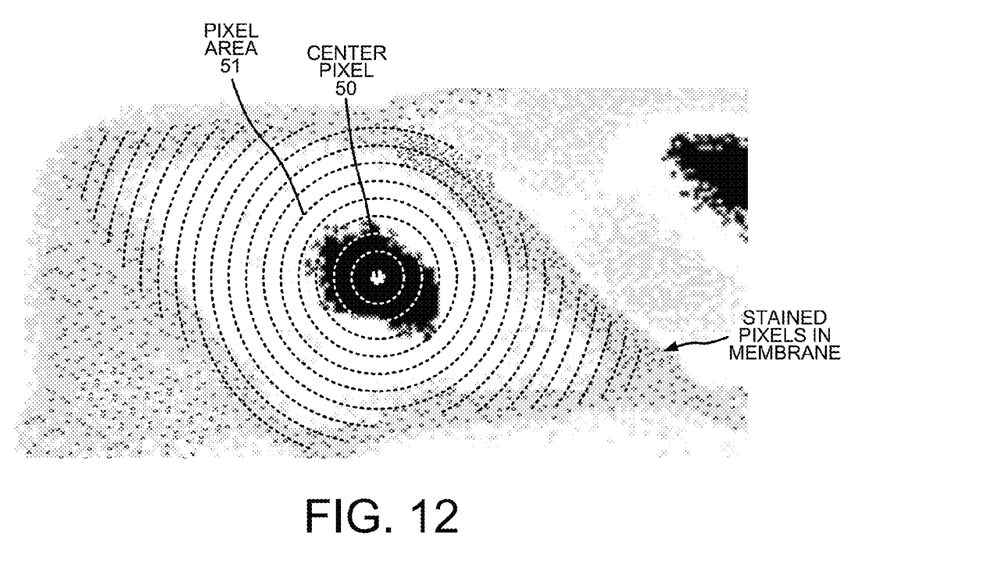
FIG. 12 is an image of a cell illustrating a segmentation process that searches for cell membranes.
Figure 13:
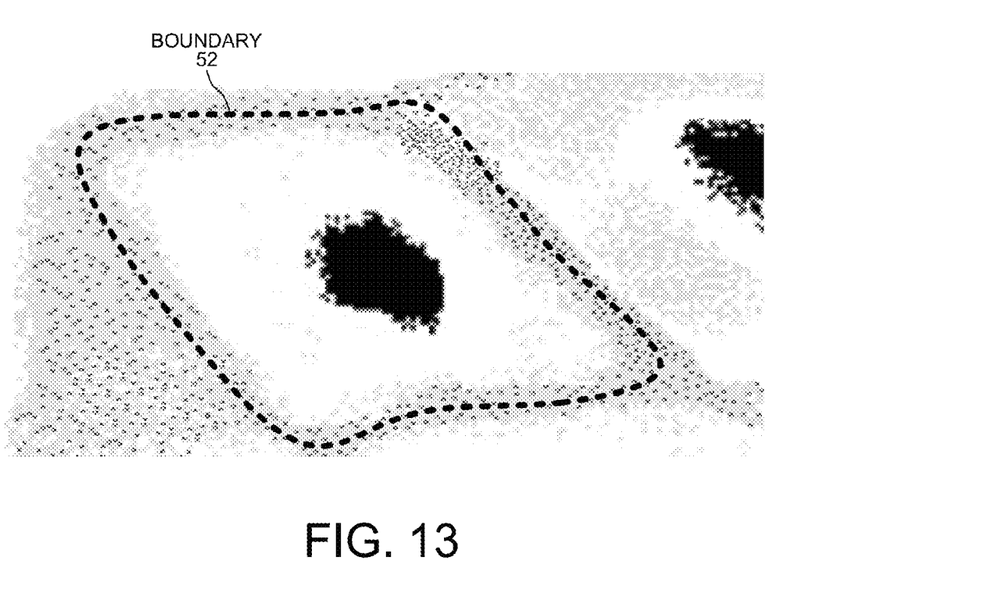
FIG. 13 shows the boundary generated by the segmentation process of FIG. 12.

FIG. 12 illustrates one example of a first segmentation process that searches for cell membranes. First, a starting pixel 50 is identified as a center pixel of any large dark mass in the tissue. The nucleus of the cell in FIG. 12 acts as the large dark mass. Even without staining with a known stain, such as hematoxylin, the nuclei still appear as masses, although less well defined. From the starting pixel, a pixel area 51 is expanded outwards into each successive neighboring pixel so long as the neighboring pixel has a color that is not more dissimilar to the predetermined color than is the previous neighboring pixel. The expanding is stopped at the earlier of (i) when the next outward pixel has a color that is less similar to the predetermined color than is the neighboring inward pixel, or (ii) when the expanding from one starting pixel meets the expanding pixel area from another starting pixel. Thus, the expanding into successive neighboring pixels is halted at a boundary 52 at which the neighboring pixel of each boundary pixel has a color that is more dissimilar to the predetermined color than is the boundary pixel. FIG. 13 shows the boundary 52 of the expanding segmentation process, which corresponds to the membrane of the cell.

The first segmentation process finds the membrane in FIG. 12 because the test biomarker has stained the membrane so that many of the pixels in the region of the membrane have the predetermined color. If the test biomarker has not stained the membrane such that a significant proportion of the pixels have the predetermined color, then the first segmentation process will search for, but not find, the first cell component.

In step 44, a second segmentation process is performed on the digital image that searches for a second cell component type that has the predetermined color. For example, the second segmentation process searches for the nucleus. One such segmentation process first determines the center pixel of a stained nucleus by generating a distance map from the lighter pixels around the nucleus. The center pixel is the pixel that is the farthest from the lighter pixels. Then the pixel area around the center pixel is expanded outwards until a large color change is detected. The large change in the color is detected when the second derivative of the function that defines the color at various pixels crosses zero. The second segmentation process finds the nucleus if the test biomarker has stained the nucleus so that many of the pixels in the region of the nucleus have the predetermined color. If the test biomarker has not stained the nucleus, then the second segmentation process will not detect a large change in color, and thus will not find the second cell component.

Figure 14:
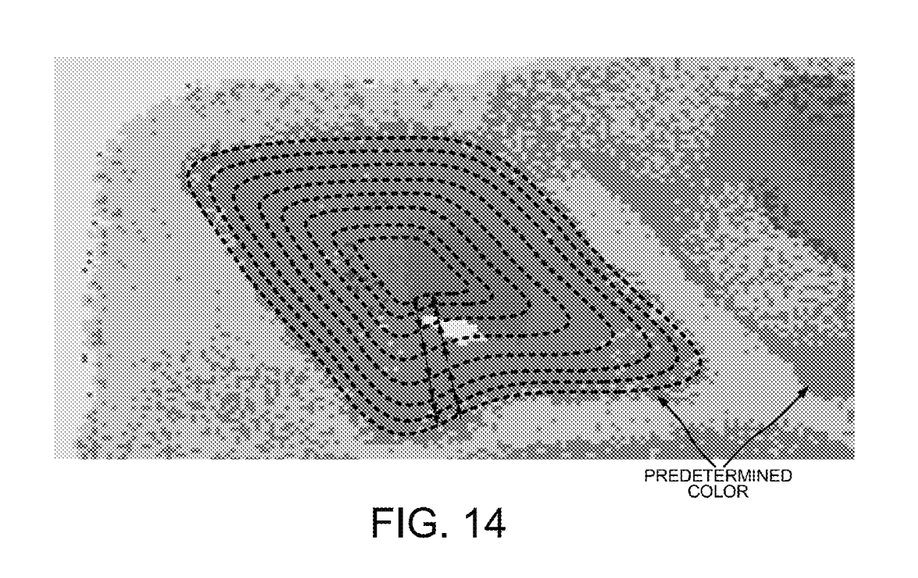
FIG. 14 is an image of a cell illustrating another segmentation process that searches for stained cytoplasm.

FIG. 14 illustrates another example of the second segmentation process. The second segmentation process illustrated in FIG. 14 searches for the cytoplasm. The process searches for a large grouping of contiguous pixels that have the predetermined color. If the test biomarker stains the cytoplasm, then many of the pixels in the region of the cytoplasm will have the predetermined color. The process then shrinks the pixel grouping from the outside boundary by a selected number of pixels. If the pixel grouping disappears after the shrinking, then the pixel grouping was not large enough to be the cytoplasm of a cell. The pixel groupings that do not disappear during the shrinking step are then re-expanded and identified as cytoplasm.

In step 45, system 10 identifies the test biomarker as a stain for the first cell component type if the first segmentation process identifies the first cell component type. For example, if the first segmentation process is chosen to search for membranes, and the process finds boundaries 52 corresponding to membranes, then system 10 will identify the test biomarker as a membrane stain. If the test biomarker does not result in a significant number of pixels in the membrane region having the predetermined color of the test biomarker, then the search for membranes will be unsuccessful, and system 10 will determine that the test biomarker is not a stain for membranes.

In step 46, the test biomarker is identified as a stain for the second cell component type if the second segmentation process identifies the second cell component type. So if the second segmentation process is chosen to search for nuclei, and the process finds the large color change that signifies the boundaries of the nuclei, then system 10 will identify the test biomarker as a stain for nuclei. But if the test biomarker does not result in a significant number of pixels within each nucleus having the predetermined color of the test biomarker, then the search for nuclei will be unsuccessful, and system 10 will determine that the test biomarker is not a stain for nuclei. It is possible that both, neither or only one of the first or second cell component types will be identified by the first and second segmentation processes. The test biomarker may stain both, neither or only one of the membrane and the nucleus of the tissue being analyzed.

In step 47, system 10 displays on graphical user interface 14 an indication of whether the test biomarker is a stain for the first cell component type and whether the test biomarker is a stain for the second cell component type.

In step 48, the first segmentation process identifies a plurality of cell components of the first cell component type. For example, the first segmentation process identifies not only the characteristic line form of a membrane, but also the circularity of the line. Each closed loop line is identified as a membrane. System 10 then counts the total number of the plurality of cell components of the first cell component type in the digital image. Whereas method 23 determines the proportion of pixels in the membrane region that are stained, method 49 determines the number of stained cell membranes in the digital image. Where the sample tissue contains cancerous cells, method 49 can be used to count the number of cancerous cells in an area of the digital image that contain proteins that have been stained by the test biomarker. For example, methods 23 and 49 can be combined to count the number of cells in a predetermined area of the sample tissue that have at least 20% of the pixels in the membrane region stained by the test biomarker. Method 49 can also determine whether the identified cell components are clumped together in the stained tissue or are dispersed throughout the tissue.

Many segmentation processes are used in method 49 to evaluate digital images of sample tissue that is stained with only the test biomarker and not a known stain. System 10 searches for the various types of cell components using the different segmentation processes and determines that the test biomarker is a stain for a particular cell component type when a segmentation process finds a particular cell component type based on pixels that have been stained by the color of the test biomarker. Segmentation processes that do not find cell components are simply disregarded.

Figure 15:
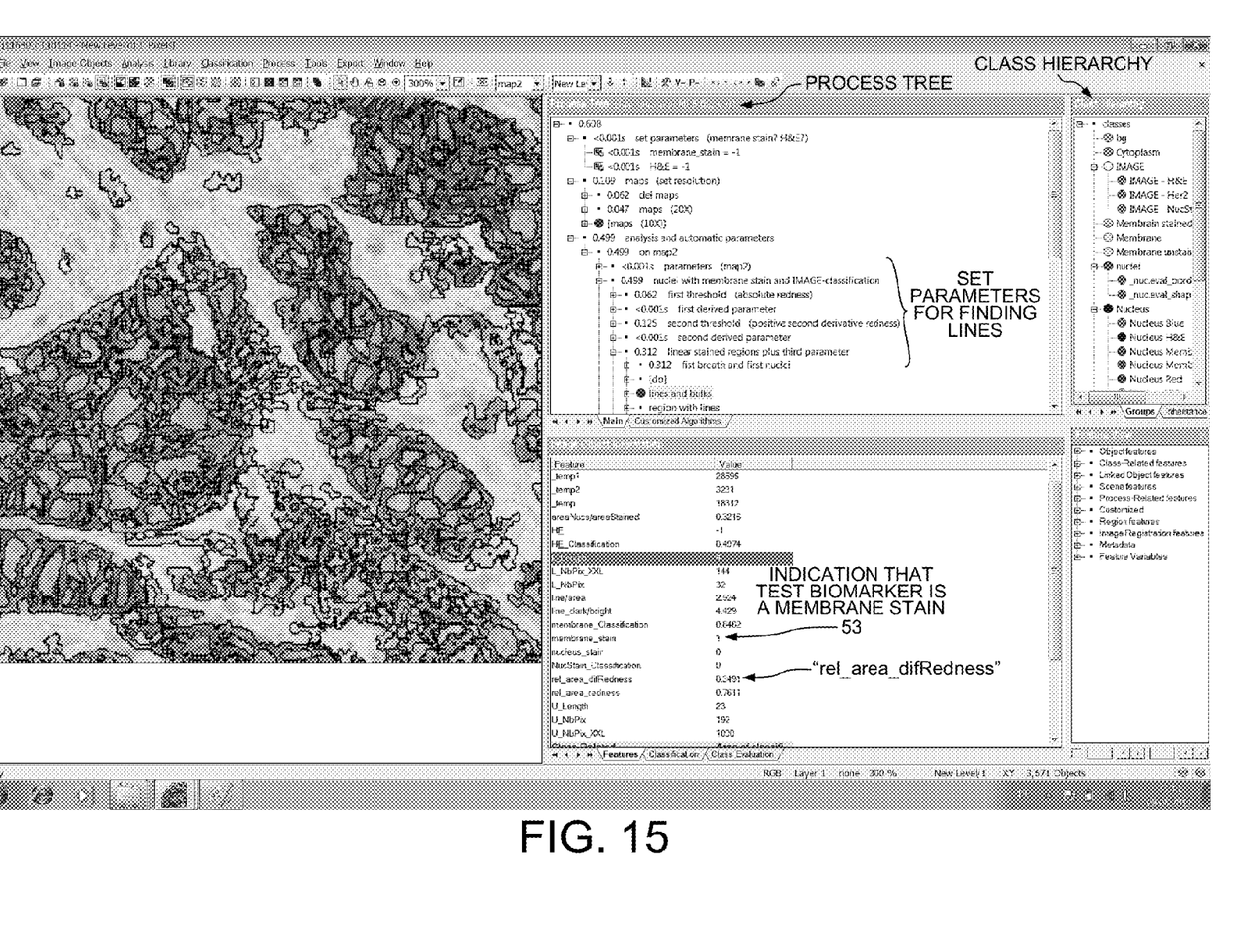
FIG. 15 is a screenshot of the graphical user interface of the system of FIG. 1 that is used to set the parameters for a segmentation process that searches for cell membranes.

FIG. 15 illustrates another example of the first segmentation process that searches for cell membranes by analyzing pixels that have a predetermined color or fall within a predetermined color range. FIG. 15 shows the graphical user interface 14 of system 10 while the parameters for the first segmentation process are being set. The software that implements system 10 is structured as a class hierarchy of classifications and a process tree of process steps. Parameters are set for each of the process steps. The segmentation process illustrated in FIG. 15 finds lines in a digital image of stained tissue by comparing each center pixel to the average color of a matrix of surrounding pixels. For example, the center pixel is at the center of a 5×5 matrix. If the center pixel falls on a line, then the center pixel will have more stained color than the average stained color in the surrounding pixels. Where the test biomarker stains red, for example, the amount by which the center pixel is closer to the stained red color than the average surrounding color is set by the parameter "difRedness". System 10 searches for lines resembling membranes having a thickness set by the parameter "rel_area_difRedness". The segmentation process illustrated in FIG. 15 has found membranes and thus determined that the test biomarker is a membrane stain. The graphical user interface shows an indication 53 that the test biomarker is a stain for membranes ("1") and is not a stain for nuclei ("0").

Figure 16:
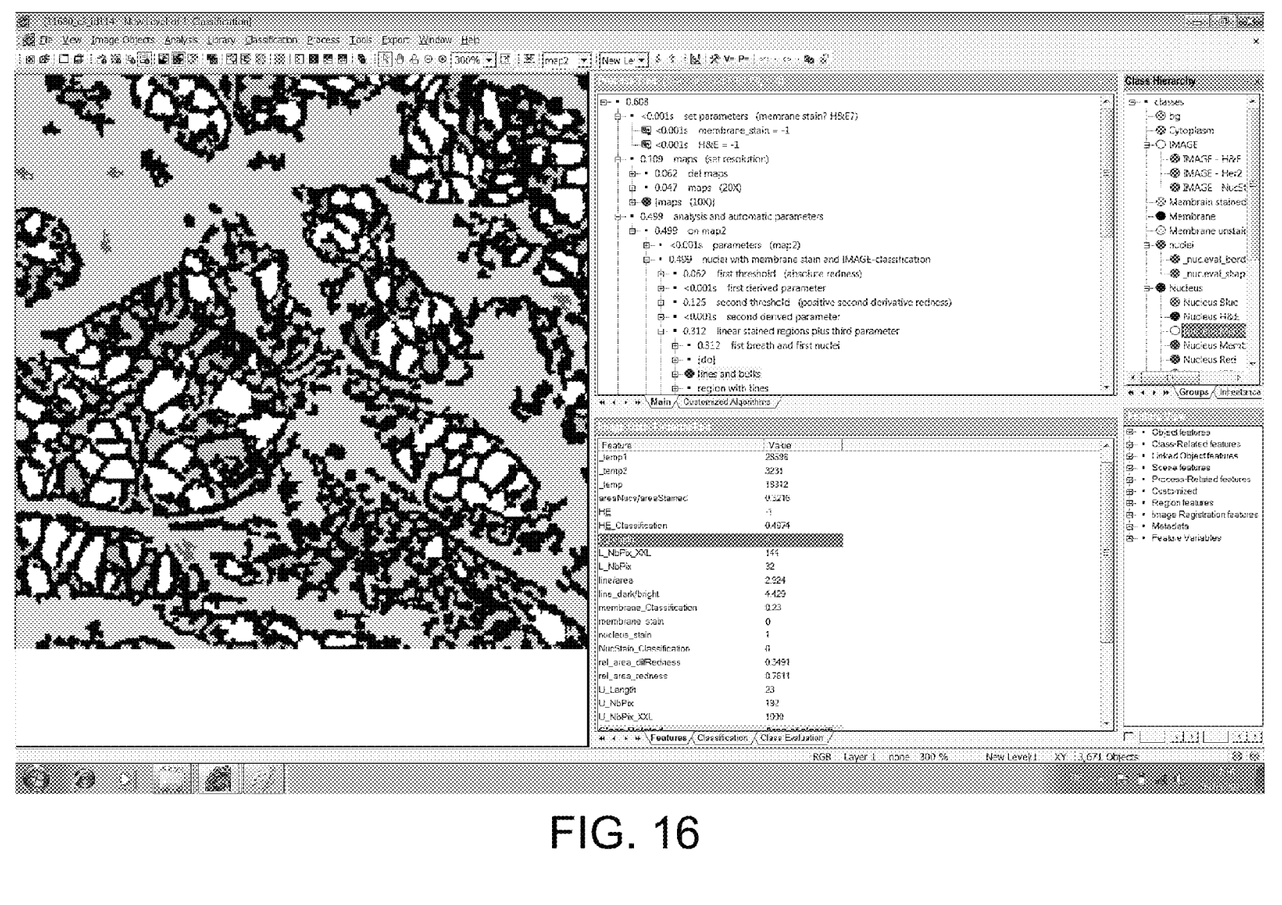
FIG. 16 is a screenshot of the graphical user interface of the system of FIG. 1 showing the results of a segmentation process that searches for nuclei.

FIG. 16 illustrates another example of the second segmentation process that searches for nuclei by analyzing pixels that have a predetermined color or fall within a predetermined color range. FIG. 16 shows the graphical user interface 14 while system 10 is searching for nuclei having the color of the test biomarker. The segmentation process of FIG. 16 finds contiguous groupings of pixels having a predetermined color. Then the segmentation process shrinks the pixel groupings by removing pixels on the outer edges of the groupings. If a pixel grouping disappears, then the grouping was not large enough to be a nucleus. The digital image at the left of FIG. 16 shows stained nuclei that have been re-expanded after the shrinking step.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
  performing a first segmentation process on a digital image that searches for a first cell component type having a predetermined color, wherein the digital image depicts tissue that is stained with a test biomarker to have the predetermined color, and wherein the first segmentation process includes:
    identifying a starting pixel in the digital image;
    expanding from the starting pixel into each successive neighboring pixel so long as the neighboring pixel has a color that is not more dissimilar to the predetermined color than is the previous neighboring pixel; and
    halting the expanding into successive neighboring pixels at a boundary at which the neighboring pixel of each boundary pixel has a color that is more dissimilar to the predetermined color than is the boundary pixel;

performing a second segmentation process on the digital image that searches for a second cell component type that has the predetermined color;
identifying the test biomarker as a stain for the first cell component type if the first segmentation process identifies the first cell component type;
identifying the test biomarker as a stain for the second cell component type if the second segmentation process identifies the second cell component type, wherein both, neither or only one of the first and second cell component types can be identified; and
displaying on a graphical user interface whether the test biomarker is a stain for the first cell component type and whether the test biomarker is a stain for the second cell component type.

2. The method of claim 1, wherein the first cell component type is a membrane, and wherein the second cell component type is a nucleus.

3. The method of claim 2, wherein the test biomarker is a stain for the first cell component type, and wherein the first cell component type is a membrane.

4. The method of claim 1, wherein the first segmentation process identifies a plurality of cell components of the first cell component type, further comprising:
counting a total number of the plurality of cell components of the first cell component type in the digital image.

5. The method of claim 1, wherein the first segmentation process identifies a plurality of cell components of the first cell component type, further comprising:
determining that the plurality of cell components of the first cell component type are clumped together.

6. The method of claim 1, wherein the first segmentation process identifies a plurality of cell components of the first cell component type, further comprising:
determining that the plurality of cell components of the first cell component type are dispersed throughout the tissue.

7. The method of claim 1, wherein the predetermined color is a range of colors, wherein the first segmentation process searches for cell components of the first cell component type that have colors within the range of colors, and wherein the second segmentation process searches for cell components of the second cell component type that have colors within the range of colors.

8. The method of claim 1, wherein the first cell component is a nucleus, and wherein the second cell component is a membrane.

9. The method of claim 1, wherein the test biomarker includes a first stain and a second stain.

10. The method of claim 1, wherein both of the first and second cell component types are identified, further comprising:
determining a first stained proportion of the first cell component type;
determining a second stained proportion of the second cell component type; and
displaying on the graphical user interface an expression profile of the test biomarker, wherein the expression profile includes the first stained proportion of the first cell component type and the second stained proportion of the second cell component type.

11. The method of claim 4, further comprising:
calculating an expression parameter for the test biomarker using the total number; and
displaying the expression parameter on the graphical user interface.

12. A method comprising:
searching a digital image for a first type of cell components that have a predetermined color, wherein the digital image depicts tissue that is stained with a test biomarker to have the predetermined color, and wherein the searching for the first type of cell components includes:
identifying a starting pixel in the digital image;
expanding from the starting pixel into each successive neighboring pixel so long as the neighboring pixel has a color that is not more dissimilar to the predetermined color than is the previous neighboring pixel; and
halting the expanding into successive neighboring pixels at a boundary at which the neighboring pixel of each boundary pixel has a color that is more dissimilar to the predetermined color than is the boundary pixel;
searching the digital image for a second type of cell components that have the predetermined color;
identifying the test biomarker as a stain for the first type of cell components if the searching identifies the first type of cell components;
identifying the test biomarker as a stain for the second type of cell components if the searching identifies the second type of cell components, wherein both, neither or only one of the first and second types of cell components can be identified; and
displaying on a graphical user interface whether the test biomarker is a stain for the first type of cell components and whether the test biomarker is a stain for the second type of cell components.

13. The method of claim 12, wherein the searching for the first type of cell components is performed using a pixel-by-pixel segmentation process.

14. The method of claim 12, wherein the predetermined color is defined as a range of colors in a multi-dimensional color space.

15. The method of claim 12, wherein the first type of cell components is a membrane, and wherein the second type of cell components is a nucleus.

16. The method of claim 12, wherein the test biomarker is a stain for the first type of cell components, and wherein the first type of cell components is a membrane.

17. The method of claim 12, further comprising:
counting a total number of the first type of cell components in the digital image that have the predetermined color.

18. The method of claim 12, further comprising:
determining that the cell components of the first type are clumped together.

19. The method of claim 12, further comprising:
determining that the cell components of the first type are dispersed throughout the tissue.

* * * * *